United States Patent Office 3,529,941
Patented Sept. 22, 1970

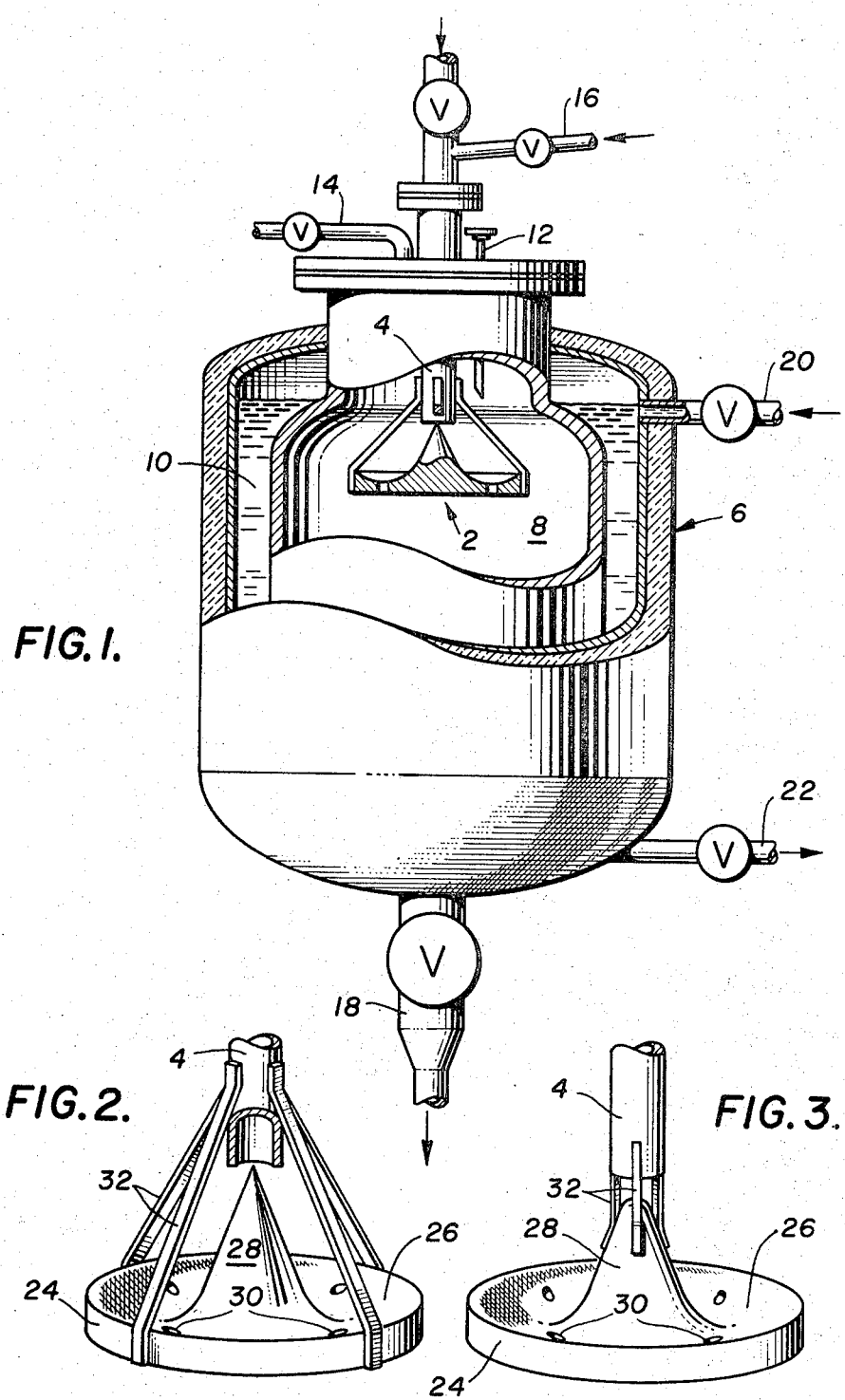

---

3,529,941
LIQUID DEFLECTION APPARATUS
Thomas J. Tobiassen, Pensacola, and Roger M. Warner, Gulf Breeze, Fla., assignors to Monsanto Company, St. Louis, Mo., a corporation of Delaware
Filed Apr. 24, 1967, Ser. No. 633,113
Int. Cl. B01j 3/02
U.S. Cl. 23—290                                1 Claim

ABSTRACT OF THE DISCLOSURE

A device for showering liquid onto the inner walls of a vessel in an annular shower flow to wash down the inner vessel walls.

BACKGROUND OF THE INVENTION

In nylon processing, polymerization of an aqueous salt solution takes place in an autoclave. In brief, a batch of a salt solution processed through an evaporator is charged to an autoclave, the batch is heated and the excess water is boiled off, controlled heat and pressure conditions are maintained until a predetermined stage of polymerization is reached, the polymerized batch is discharged, and the autoclave is then filled with another batch of salt.

In use, a very thin layer of polymer forms on the inner surfaces of the autoclave walls during the polymerization of each batch. During the processing of successive batches, this material accumulates in layers and stalactites which gradually degrade to form gel and/or carbonized polymer. There is a particular ring deposit of residue near the top of the autoclave defining the upper level of the batches processed. Eventually the residue accumulates to the point where it chips and mixes with new batches of salt, thus degrading the quality of the polymer produced. If the walls are washed down while the autoclave is being charged with each succeeding batch, the accumulation of residue is prevented.

In the prior art, Canadian Pat. No. 740,053 discloses a method and apparatus for minimizing gel formation during the polymerization of polymer forming materials in an autoclave. The nylon salt is sprayed through angled discharge holes formed in the salt delivery conduit. With this suggested arrangement, however, the small angled holes are conducive to the forming of gel and because the spray is formed by a plurality of separate streams issuing from holes in the conduit, the autoclave wall is not sprayed uniformly.

SUMMARY

The invention comprises, according to a workable embodiment, a liquid deflector having a circumferential concavity surrounding a central crown and positioned substantially coaxially beneath a liquid supply pipe extending into a vessel—an autoclave for example. A stream of liquid being delivered for processing to the vessel is distributed or spread radially to form a circuate downward and upward flow that is deflected in an unbroken circular shower to fall upon the inner walls of the vessel. The circular fountain shower washes down the vessel walls uniformly and provides an advantage over the method of squirting autoclave walls with separate streams of liquid flowing from angled holes formed in a conduit as suggested in the prior art.

BRIEF DESCRIPTION OF THE DRAWINGS

A better understanding of the invention will be gained by reference to the following description and to the drawings. In the drawings:

FIG. 1 is an elevation view of a typical autoclave with a portion cut away showing in cross-section the liquid deflector comprising the invention, FIG. 2 is a perspective view of the novel liquid deflector, and FIG. 3 is a perspective view of another construction of the liquid deflector.

DESCRIPTION OF THE PREFERRED EMBODIMENTS

Referring to the drawing, the liquid deflector 2 is illustrated in FIG. 1 secured to an inlet conduit 4 of an autoclave 6. Since autoclaves are widely known structures used in chemical processing only the necessary detail thereof for forming a background of the invention is described herein.

The essential elements of an autoclave used in nylon processing comprise an enclosed chamber 8 defined an inner wall surrounded by a heating chamber 10 through which a heated fluid is circulated. Heating coils (not shown) may be used in chamber 8. Inlet conduit 4 extends into and terminates near the necked-down upper end of chamber 8. A pipe 12, for introducing additives, and a steam bleed-off pipe 14 communicate with chamber 8. An inert gas delivery pipe 16 opens into inlet conduit 4, and a polymer discharge line 18 is provided at the bottom of the autoclave. Heating chamber 10 is supplied with a vapor and discharged of condensate through pipes 20, and 22, respectively. The pipes, conduits and lines are all provided with required valving.

The liquid deflector 2 is positioned below the end of conduit 4 and comprises a plate 24 with a circular depression, trough or channel 26 of concave configuration surrounding a central boss or cusp 28, preferably conical in shape. The outside rim of the circumferential channel 26 preferably ends in a sharp edge or lip. Drainage holes 30 may be provided at the bottom of the circular channel 26. The surfaces defining cusp 28 and circular channel 26 are smooth and continuous.

Deflector plate 24 is secured fixedly to conduit 4 by a plurality of braces 32 and depends therefrom in chandelier manner. FIGS. 2 and 3 show different ways of securement of braces 32. Cusp 28 is coaxially aligned with conduit 4 and projects upwardly close to or slightly into the bore or opening of conduit 4.

In process, a nylon salt solution is charged to autoclave 6 through conduit 4. The solution flows as a single stream onto cusp 28 of deflector 2 and spreads radially over cusp 28, flows downwardly and upwardly over the concave surface of channel 26 and is deflected, cast or showered from deflector 2 onto the wall defining chamber 8 in an annular shower flow. The forming of a sharp lip along the outer periphery of channel 26 provides less of a spill-over of the liquid over the side of plate 24. The concave surface of channel 26 controls the flow of liquid in an upward direction as it leaves the deflector 2. If the neck of the autoclave is to be washed down, deflector 2 and conduit 4 may be arranged closer to the neck. Best results are obtained with a vertical-horizontal alignment of conduit 4 to deflector plate 24.

After autoclave 6 is charged with the salt solution, conventional procedures for processing the salt are carried out. In stages, the solution is heated under a predetermined pressure, steam is bled-off through pipe 14, and the pressure is stabilized while heating is continued until a preset concentration of the salt is reached. Additives may be mixed at this time via pipe 12. The heating and bleed-off of steam is continued for a predetermined time and the pressure is then reduced to atmospheric. A holding cycle follows and finally the processed salt solution is discharged in the form of a polymerized batch.

A new salt solution batch is then charged to the autoclave and the process is repeated.

Using deflector 2 in an autoclave provides improved apparatus and process. The inside wall of the autoclave is completely and uniformly washed down by the unbroken-line circumferential shower each time the autoclave is charged with a new batch of salt. Deflector 2 is self-cleaning and inspection thereof and of the inner walls of an autoclave after at least eight hundred batches of salt were processed therethrough showed no traces of stalactite residue buildup. Improvement in polymer quality and particularly in the lessened occurrence of specks therein was noted.

It will be understood that variations and departures from the specific embodiments of the invention illustrated and described herein are expected to be covered within the equivalents thereof and within the scope of the following claim:

We claim:

1. In a polymer processing autoclave of the type having an outer thermal jacket, a defined inner chamber, a supply conduit extending into the inner chamber and terminating centrally at the upper end thereof, and an outlet port at the lower end thereof, the improvement comprising in combination, a liquid deflector plate fixedly secured to the supply conduit by support means horizontally positioning said plate directly below the discharge end of the supply conduit to receive liquid therefrom, said plate defining at its side facing the discharge end of the supply conduit an upwardly projecting, central boss aligned closely adjacent to and centrally beneath the discharge end of the supply conduit, said boss being joined by smooth, continuous surface generation to a surrounding, circumferential trough provided with drainage means defined in said plate and provided with a sharp, peripheral, annular lip that is spaced a predetermined distance from the inner chamber wall, whereby, liquid flows unrestrictedly from said supply conduit onto said boss, is spread radially while flowing downwardly into said trough and is broken away or deflected radially, upwardly and outwardly in a uniform circular flow from said sharp, peripheral, annular lip onto the upper, inner chamber wall for washing down the latter and reducing the formation of encrusted material normally deposited thereon.

References Cited

UNITED STATES PATENTS

| | | | |
|---|---|---|---|
| 1,148,194 | 7/1915 | Seifert et al. | 23—283 XR |
| 1,629,200 | 5/1927 | Buhtz | 25—252 XR |
| 3,407,179 | 10/1968 | Carr | 23—285 XR |

FOREIGN PATENTS 1,106,820  7/1955  France.

JAMES H. TAYMAN, JR., Primary Examiner

U.S. Cl. X.R.

23—285, 283; 134—22; 239—524, 504; 260—78; 261—115